United States Patent
Yang et al.

(10) Patent No.: US 11,462,338 B2
(45) Date of Patent: *Oct. 4, 2022

(54) SCINTILLATION CRYSTAL INCLUDING A CO-DOPED SODIUM HALIDE

(71) Applicant: SAINT-GOBAIN CERAMICS & PLASTICS, INC., Worcester, MA (US)

(72) Inventors: Kan Yang, Livingston, NJ (US); Peter R. Menge, Novelty, OH (US); John M. Frank, Akron, OH (US)

(73) Assignee: SAINT-GOBAIN CERAMICS & PLASTICS, INC., Worcester, MA (US)

(*) Notice: Subject to any disclaimer, the term of this patent is extended or adjusted under 35 U.S.C. 154(b) by 50 days.

This patent is subject to a terminal disclaimer.

(21) Appl. No.: 17/032,756

(22) Filed: Sep. 25, 2020

(65) Prior Publication Data

US 2021/0012919 A1      Jan. 14, 2021

Related U.S. Application Data

(63) Continuation of application No. 16/670,473, filed on Oct. 31, 2019, now Pat. No. 10,825,573, which is a (Continued)

(51) Int. Cl.
*G21K 4/00* (2006.01)
*G01T 1/202* (2006.01)

(52) U.S. Cl.
CPC .............. *G21K 4/00* (2013.01); *G01T 1/202* (2013.01)

(58) Field of Classification Search
CPC ......... G21K 4/00; G01T 1/202; G01T 1/2023; G01T 1/161; G01V 5/04
See application file for complete search history.

(56) References Cited

U.S. PATENT DOCUMENTS

| 4,839,090 A | * | 6/1989 | Rosette | .............. | C09K 11/0833 |
| | | | | | 252/301.4 H |
| 9,947,427 B2 | | 4/2018 | Yang et al. | | |

(Continued)

FOREIGN PATENT DOCUMENTS

| WO | 2016081470 A1 | 5/2016 |
| WO | 2016133840 A1 | 8/2016 |

OTHER PUBLICATIONS

Aberg, D. et al., "Origin of resolution enhancement by co-doping of scintillators: Insight from electronic structure calculations," Applied Physics Letters 104, 211908 (2014), pp. 1-4.

(Continued)

*Primary Examiner* — Marcus H Taningco
(74) *Attorney, Agent, or Firm* — Abel Schillinger, LLP; Robert N Young (57) ABSTRACT

A scintillation crystal can include a sodium halide that is co-doped with thallium and another element. In an embodiment, the scintillation crystal can include NaX:Tl, Me, wherein X represents a halogen, and Me represents a Group 1 element, a Group 2 element, a rare earth element, or any combination thereof. In a particular embodiment, the scintillation crystal has a property including, for radiation in a range of 300 nm to 700 nm, an emission maximum at a wavelength no greater than 430 nm; or an energy resolution less than 6.4% when measured at 662 keV, 22° C., and an integration time of 1 microsecond. In another embodiment, the co-dopant can be Sr or Ca. The scintillation crystal can have lower energy resolution, better proportionality, a shorter pulse decay time, or any combination thereof as compared to the sodium halide that is doped with only thallium.

20 Claims, 4 Drawing Sheets

Related U.S. Application Data continuation of application No. 16/163,705, filed on Oct. 18, 2018, now Pat. No. 10,497,484, which is a continuation of application No. 15/908,165, filed on Feb. 28, 2018, now Pat. No. 10,134,499, which is a continuation of application No. 15/043,812, filed on Feb. 15, 2016, now Pat. No. 9,947,427.

(60) Provisional application No. 62/116,734, filed on Feb. 16, 2015.

(56) References Cited

U.S. PATENT DOCUMENTS

| | | | |
|---|---|---|---|
| 10,134,499 B2 | 11/2018 | Yang et al. | |
| 2007/0108393 A1 | 5/2007 | Shoji et al. | |
| 2010/0268074 A1* | 10/2010 | Van Loef | G01T 1/2018 600/431 |
| 2012/0085972 A1 | 4/2012 | LaCourse et al. | |
| 2012/0305778 A1 | 12/2012 | Menge et al. | |
| 2014/0117242 A1 | 5/2014 | Dorenbos et al. | |
| 2014/0271436 A1 | 9/2014 | Quinton et al. | |
| 2014/0319362 A1 | 10/2014 | Yasui | |
| 2016/0238718 A1 | 8/2016 | Yang et al. | |
| 2017/0355905 A1 | 12/2017 | Bourret-Courchesne et al. | |

OTHER PUBLICATIONS

Adhikari, R. et al., "DX-Like Centers in NaI:TI Upon Aliovaient Codoping," Journal of Applied Physics, vol. 116, 223703 (2014), pp. 223703-1-223703-6.

Gascón, M. et al., "Non-Proportionality Studies Through the Application of High Isostatic Pressure," Advanced Optical Ceramics Laboratory, LUMDETR, Halle, Germany, dated Sep. 11, 2012, pp. 1-19.

Gascón, M. et al., "Scintillation properties of CsBa2I5 activated with monovalent ions Tl+, Na+ and In+," Journal of Luminescence, vol. 156, pp. 63-68, Aug. 2, 2014.

Li, Q. et al., "A Transport-Based Model of Material Trends in Nonproportionality of Scintillators," Journal of Applied Physics, vol. 109, 123716, (2011), pp. 123716-1-123716-17.

Li, Q. et al., Theoretical and Experimental investigation of Solid-Solution Scintillator Material Properties in the Model System of Tl+ Activated NaBrxI(1-x) and Na(1-x)KxI, Wake Forest University, SORMA, dated Jun. 9, 2014, 23 pages.

Pushak, A.S. et al., "Luminescence of SrX2 Microcrystais (X-Cl, I)Activated with Eu2+ Ions and Dispersed in a NaI Matrix," Optics and Spectroscopy, Pleiades Publishing, Ltd,. vol. 117, No. 4, (2014) pp. 593-597.

Setyawan, W. et al., "Comparative Study of Nonproportionality and Electronic Band Structures Features in Scintillator Materials," IEEE Transactions on Nuclear Science, vol. 56, No. 5, dated Oct. 2009, pp. 2989-2996.

Shiran, N. et al., "Eu Doped and Eu, Tl Co-Doped NaI Scintillators," IEEE Transactions on Nuclear Science, vol. 57, No. 3, dated Jun. 2010, pp. 1233-1235.

Shiran, N. et al., "Eu Doped and Eu, Tl Co-Doped NaI Scintillators," Institute for Scintillation Materials, Kharkov, Ukraine, General Aspects of Energy Transport, dated 2009, pp. 1-19.

Shiran, N. et al., "Modification of NaI Crystal Scintillation Properties by Eu-Doping," Optical Materials, vol. 32, No. 10, dated 2010, pp. 1345-1348.

Sysoeva, E. et al., "Comparison of the Methods for Determination of Scintillation Light Yield," Nuclear Instruments and Methods in Physics Research A, vol. 486, No. 1, dated 2002, pp. 67-73.

Yang, K. et al., "Improving γ-ray Energy Resolution, Non-Proportionality, and Decay Time of NaI:Tl+ with Sr2+ and Ca2+ Co-Doping," Journal of Applied Physics, vol. 118, 213106 (2015), pp. 213106-1-213106-5.

International Search Report and Written Opinion for PCT/US2016/017945, dated Apr. 28, 2016, 17 pages.

\* cited by examiner

SCINTILLATION CRYSTAL INCLUDING A CO-DOPED SODIUM HALIDE

CROSS-REFERENCE TO RELATED APPLICATION

The present application is a continuation and claims priority under 35 U.S.C. § 120 to U.S. Non-Provisional patent application Ser. No. 16/670,473, filed Oct. 31, 2019, entitled "Scintillation Crystal Including a Co-Doped Sodium Halide," naming as inventors Kan Yang et al., which is a continuation and claims priority under 35 U.S.C. § 120 to U.S. Non-Provisional patent application Ser. No. 16/163,705, filed Oct. 18, 2018, entitled "Scintillation Crystal Including a Co-Doped Sodium Halide," naming as inventors Kan Yang et al., now U.S. Pat. No. 10,497,484, which is a continuation and claims priority under 35 U.S.C. § 120 to U.S. Non-Provisional patent application Ser. No. 15/908,165, filed Feb. 28, 2018, entitled "Scintillation Crystal Including a Co-Doped Sodium Halide," naming as inventors Kan Yang et al., now U.S. Pat. No. 10,134,499, which is a continuation and claims priority under 35 U.S.C. § 120 to U.S. Non-Provisional patent application Ser. No. 15/043,812, filed Feb. 15, 2016, entitled "Scintillation Crystal Including a Co-Doped Sodium Halide, and a Radiation Detection Apparatus Including the Scintillation Crystal," naming as inventors Kan Yang et al., now U.S. Pat. No. 9,947,427, which claims priority under 35 U.S.C. § 119(e) to U.S. Provisional Patent Application No. 62/116,734, filed Feb. 16, 2015, entitled "Scintillation Crystal Including a Co-Doped Sodium Halide, and a Radiation Detection Apparatus Including the Scintillation Crystal," naming as inventors Kan Yang et al., all of which are assigned to the current assignee hereof and are incorporated by reference herein in their entireties.

FIELD OF THE DISCLOSURE

The present disclosure is directed to scintillation crystals including rare earth halides and radiation detection apparatuses including such scintillation crystals.

BACKGROUND

NAI:Tl is a very common and well known scintillation crystal. Further improvements with NAI:Tl scintillation crystals are desired.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

Group numbers corresponding to columns within the Periodic Table of the elements use the "New Notation" convention as seen in the CRC Handbook of Chemistry and Physics, $81^{st}$ Edition (2000-2001).

The term "rare earth" or "rare earth element" is intended to mean Y, Sc, and the Lanthanoid elements (La to Lu) in the Periodic Table of the Elements.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

A scintillation crystal can include a sodium halide that is co-doped with thallium and another element. The co-doping can improve energy resolution, proportionality, light yield, decay time, another suitable scintillation parameter, or any combination thereof. In an embodiment, the scintillation crystal can include NaX:Tl, Me, wherein X represents a halogen, and Me represents a Group 1 element, a Group 2 element, a rare earth element, or any combination thereof. The selection of a particular co-dopant may depend on the particular scintillation parameters that are to be improved.

As used in this specification, co-doping can include two or more different elements (Tl and one or more other elements), and co-dopant refers to the one or more dopants other than Tl.

With respect to the composition of the sodium halide, X can be I or a combination of I and Br. When X is a combination of I and Br, X can include at least 50 mol %, at least 70 mol %, or at least 91 mol % I. In an embodiment, Tl can have a concentration of at least $1\times10^{-4}$ mol %, at least $1\times10^{-3}$ mol %, or at least 0.01 mol %, and in another embodiment, Tl has a concentration no greater than 5 mol %, no greater than 0.2 mol %, or no greater than 0.15 mol %. In a particular embodiment, Tl has a concentration in a range of $1\times10^{-4}$ mol % to 5 mol %, $1\times10^{-3}$ mol % to 0.2 mol %. In a more particular embodiment, the Tl has a concentration in a range of 0.03 mol % to 0.15 mol % exhibits good performance, such as high light yield and good energy resolution.

In an embodiment when the co-dopant is a Group 1 element or a Group 2 element, the dopant concentration of the Group 1 element or the Group 2 element is at least $1\times10^{-4}$ mol %, at least $1\times10^{-3}$ mol %, or at least 0.01 mol %, and in another embodiment, the concentration is no greater than 5 mol %, no greater than 0.9 mol %, or no greater than 0.2 mol %. In a particular embodiment, the concentration of the Group 1 element or Group 2 element is in a range of $1\times10^{-4}$ mol % to 5 mol %, $1\times10^{-3}$ mol % to 0.9 mol %, or 0.01 mol % to 0.2 mol %. In an embodiment when the co-dopant is a rare earth element, the dopant concentration of the rare earth element is at least $5\times10^{-4}$ mol % or at least $8\times10^{-4}$ mol %, and in another embodiment, the dopant concentration is no greater than 0.5 mol %, 0.05 mol %, or $5\times10^{-3}$ mol %. All of the preceding dopant concentrations are for dopant concentrations in the crystal.

In a particular embodiment, the scintillation crystal is monocrystalline. The concentration of dopants in the crystal may or may not be different from the concentrations of dopants in the melt from which the scintillation crystal is formed. The concentrations of Tl and Group 1 and Group 2 co-dopants in a melt in forming the crystal can include any of the values as previously described. Rare earth elements, and particular, La and heavier elements are relatively large as compared to Na atoms, and thus, a significantly lower concentration of a rare earth element can result. Thus, in one embodiment, for a rare earth element, the dopant concentration in the melt may be higher, such as at least $1\times10^{-3}$ mol %, at least $5\times10^{-3}$ mol %, or at least 0.01 mol %. After reading this specification in its entirety, skilled artisans will be able to determine the amounts of dopants to be in a melt to achieved desired dopant concentrations in a scintillation crystal after considering segregation coefficients for such dopants.

When selecting a co-dopant, different considerations may determine which particular elements are better suited for improving particular scintillation parameters as compared to other elements. The description below is to be used as general guidance and not construed as limiting particular scintillation parameters to particular co-dopants.

In an embodiment, the wavelength of emission maximum for NaX:Tl, Me scintillation crystal may be kept relatively the same as NaX:Tl, so that the quantum efficiency of a photosensor that is or will be coupled to the scintillation crystal is not significantly changed. For radiation in a range of 300 nm to 700 nm, NaI:Tl has an emission maximum between 415 nm and 420 nm when the scintillation crystal is exposed to gamma radiation having an energy of 60 keV. In an embodiment, for radiation in a range of 300 nm to 700 nm, the co-doped scintillation crystal has an emission maximum at a wavelength of at least 400 nm, at least 405 nm, or at least 410 nm when the scintillation crystal is exposed to gamma radiation having an energy of 60 keV, and in another embodiment, the co-doped scintillation crystal has an emission maximum at a wavelength no greater than 430 nm, no greater than 425 nm, or no greater than 420 nm when the scintillation crystal is exposed to gamma radiation having an energy of 60 keV. In a particular embodiment, the co-doped scintillation crystal has an emission maximum at a wavelength in a range of 400 nm to 430 nm, 405 nm to 425 nm, or 410 nm to 420 nm when the scintillation crystal is exposed to gamma radiation having an energy of 60 keV.

Many Group 1, Group 2, and rare earth elements may be a co-dopant in NaX:Tl, Me without significantly affecting the wavelength of the emission maximum as compared to NaX:Tl. Co-doping with a rare earth element can increase light yield. Some of the rare earth elements may be better suited for use without affecting the emission maximum. For example, co-doping with Sc, Y, La, Lu, and Yb are less likely to affect significantly the wavelength of the emission maximum. Eu may shift the emission maximum to approximately 440 nm, and such a shift may cause the quantum efficiency to decrease or a different photosensor with a higher quantum efficiency at 440 nm to be selected. Co-doping with other rare earth elements that are more likely to cause a significant shift in the wavelength of the emission maximum may include Sm, Pr, Nd, and Tb.

Scintillation crystals that include co-doping with both a divalent metal element (e.g., a Group 2 element) and a rare earth element, in addition to Tl, can provide improved performance. The combination of the divalent metal element and the rare earth element as co-dopants in the scintillation crystal can have improved (lower) energy resolution, improved (faster) pulse decay time, and suppress defect color centers. Particular embodiments include NaX:Tl co-doped with Sr and Y or co-doped with Ca and Y.

Energy resolution (also called pulse height resolution or PHR) is improved as the energy resolution can be smaller for the co-doped scintillation crystals. Unless specified otherwise, the industry standard for determining energy resolution is to expose a scintillation crystal to $^{137}Cs$, which emits gamma radiation at an energy of 662 keV. The testing is performed at room temperature, such as 20° C. to 25° C., and 22° C. in a particular testing method. The energy resolution is the full width at the half maximum of the 662 keV peak divided by the peak height. Energy resolution is typically expressed as a percentage. Energy resolution may be determined over an integration time, also referred to as shaping time. Good energy resolution at a relatively short integration time corresponds to a shorter time to correctly identify a radiation source.

In an embodiment, the scintillation crystal has an energy resolution less than 6.4%, less than 6.2%, or less than 6.0% when measured at 662 keV, 22° C., and an integration time of 1 microsecond. In another embodiment, the scintillation crystal has an energy resolution less than 6.1%, less than 6.0%, or less than 5.9% when measured at 662 keV, 22° C., and any integration time in a range of 1 microsecond to 4 microseconds. Although no lower limit for the energy resolution is known at this time, the scintillation crystal may an energy resolution of at least 0.1% at any integration time in a range of 1 microsecond to 4 microseconds. As a basis for comparison, NaI:Tl has an energy resolution greater than 6.2% at integration times of 1, 2, and 4 microseconds.

Group 2 elements are particularly well suited in achieving good energy resolution. Ca and Sr are particularly well suited for achieving low energy resolution. NaI:Tl, Sr can achieve an energy resolution of 5.3% at an integration time of 1 microsecond, and NAI:Tl, Ca can achieve an energy resolution of 5.4% at an integration time of 1 microsecond. Even lower energy resolutions may be achieved with further optimization. Compare such energy resolution to NAI:Tl, Eu, which is reported to have an energy resolution of greater than 6.4% at an integration time of 1 microsecond, and greater than 6.2% at an integration time of 4 microseconds. In a particular embodiment, the energy resolution is at least 0.1% at an integration time of 1 microsecond.

Group 1 elements may also improve energy resolution. While not being bound by theory, the use of relatively larger Group 1 elements that are substituted for Na atoms may put the crystal lattice in tension and improve hole mobility. Thus, K, Rb, and Cs may be used. K has a relatively high concentration of a radioactive isotope, so Rb and Cs may be better candidates for a co-dopant.

Proportionality has recently received more attention with respect to scintillation crystals. Ideally, light yield is a perfect linear function of energy. Thus, at any energy for a particular scintillation crystal composition, identification of a radiation source may be easier and be performed with more confidence as a plot of light yield vs. energy is a perfectly straight line. In reality, the light yield can deviate from perfect linearity, and such deviation is typically greater at lower energies. One method to determine proportionality of a scintillation crystal is to determine the light yield at a high energy, such as 2615 keV. In a plot of light yield vs. energy, a straight line goes from a point corresponding to 0 light yield, 0 energy (0, 0) to another point corresponding to the light yield at 2615 keV, 2615 keV ($LY_{2615}$, 2615).

In terms of an equation, the relative light yield at a particular energy (in units of keV), as normalized to the light yield at 2615 keV, is:

$$\text{relative light yield} = \frac{\text{actual light yield}}{\text{predicted light yield}},$$

where the actual light yield is at the particular energy, and the predicted light yield is:

$$\text{predicted light yield} = \frac{\text{particular energy}}{2615 \text{ keV}} \times LY_{2615},$$

where $LY_{2615}$ is the actual light yield at 2615 keV.

An average relative light yield can be obtained by integrating the relative light yield over a particular energy range to obtain an integrated value, and dividing the integrated value by the particular energy range.

A relative light yield of 1.00 corresponds to perfect proportionality. As the deviation increases, either higher than 1.00 or less than 1.00, proportionality is worse. For example a relative light yield of 0.98 is better than 1.05 because 1.00 is closer to 0.98 than to 1.05.

In an embodiment, at energies in a range of 32 keV to 81 keV, the scintillation crystal has an average relative light yield as normalized to a light yield at 2615 keV of at least 1.01, at least 1.04, or at least 1.07. In another embodiment, at energies in the range of 32 keV to 81 keV, the scintillation crystal has an average relative light yield as normalized to a light yield at 2615 keV of no greater than 1.15, no greater than 1.13, or no greater than 1.11. In a particular embodiment, at energies in the range of a 32 keV to 81 keV, the scintillation crystal has an average relative light yield as normalized to a light yield at 2615 keV that is in a range of 1.01 to 1.15, 1.04 to 1.13, or 1.07 to 1.11. As a basis for comparison, at energies in the range of 32 keV to 81 keV, NAI:Tl has an average relative light yield as normalized to a light yield at 2615 keV that is over 1.15.

Although not as great, improvement can be seen at intermediate energies. In an embodiment, at energies in a range of 122 keV to 511 keV, the scintillation crystal has an average relative light yield as normalized to a light yield at 2615 keV of at least 1.01, at least 1.02, or at least 1.03. In another embodiment, at energies in the range of 122 keV to 511 keV, the scintillation crystal has an average relative light yield as normalized to a light yield at 2615 keV no greater than 1.07, no greater than 1.06, or no greater than 1.05. In a particular embodiment, at energies in the range of 122 keV to 511 keV, the scintillation crystal has an average relative light yield as normalized to a light yield at 2615 keV that is in a range of 1.01 to 1.07, 1.02 to 1.06, or 1.03 to 1.05. As a basis for comparison, at energies in the range of 122 keV to 511 keV, NAI:Tl has an average relative light yield as normalized to a light yield at 2615 keV that is approximately 1.08.

Group 2 elements are good in achieving proportionality. Ca and Sr are particularly well suited for achieving proportionality closer to 1.00 for relative low and intermediate energy ranges. For energies in a range of 32 to 81 keV, NAI:Tl, Sr can achieve an average relative light yield as normalized to a light yield at 2615 keV of 1.09, and NAI:Tl, Ca can achieve an average relative light yield as normalized to a light yield at 2615 keV of 1.15. For energies in a range of 122 to 511 keV, NAI:Tl, Sr can achieve an average relative light yield as normalized to a light yield at 2615 keV of 1.04, and NAI:Tl, Ca can achieve an average relative light yield as normalized to a light yield at 2615 keV of 1.06.

Scintillation pulse decay time can be decreased with a co-dopant as compared to the composition without the co-dopant. In an embodiment, the scintillation crystal with the co-dopant has a pulse decay time that is at least 5%, at least 11%, or at least 20% less than a pulse decay time a NAI:Tl crystal when the scintillation crystal and the NAI:Tl crystal are measured at 22° C. and exposed to gamma radiation having an energy of 662 keV. In another embodiment, the scintillation crystal with the co-dopant has a pulse decay time that is no greater than 80%, no greater than 65%, or no greater than 50% less than a pulse decay time of NaI:Tl crystal when the scintillation crystal and the NaI:Tl crystal are measured at 22° C. and exposed to gamma radiation having an energy of 662 keV. In a particular embodiment, the scintillation crystal with the co-dopant has a pulse decay time that is in a range of 5% to 80%, 11% to 65%, or 20% to 50% less than a pulse decay of a NaI:Tl crystal when the scintillation crystal and the NaI:Tl crystal are measured at 22° C. and exposed to gamma radiation having an energy of 662 keV. With respect to actual times, a NaI:Tl crystal may have a pulse decay time of approximately 230 ns, and a NAI:Tl, Sr crystal can have a pulse decay time as low as 160 ns. Similar improvement can occur with NAI:Tl, Ca.

The scintillation crystal can be formed using any one of a variety of crystal growing techniques including Bridgman, Czochralski, Kyropoulos, Edge-defined Film-fed Growth (EFG), Stepanov, or the like. The starting materials include a sodium halide and halides of the dopants. In an embodiment, the starting materials can include NaI and TlI, and depending on the co-dopant, the starting material can include any one or more of $CaI_2$, $SrI_2$, $LaI_3$, $YI_3$, $ScI_3$, $LuI_3$, RbI, CsI, or the like. If a relatively small amount of bromine to be added, any of the dopants (Tl or any of the co-dopants) can be a corresponding bromide. If more bromine is desires, NaBr may be substituted for some of the NaI. After determining a desired composition of the scintillation crystal, skilled artisan will be able to use segregation coefficients for the dopants with respect to the base material (e.g., NaI) to determine amounts of starting materials to use in the melt. Crystal growing conditions can the same as used in forming NaI:Tl or may have relatively small changes to optimize the crystal formation process.

Any of the scintillation crystals as previously described can be used in a variety of applications. Exemplary applications include gamma ray spectroscopy, isotope identification, Single Positron Emission Computer Tomography (SPECT) or Positron Emission Tomography (PET) analysis, x-ray imaging, oil well-logging detectors, and detecting the presence of radioactivity. The scintillation crystal can be used for other applications, and thus, the list is merely exemplary and not limiting. A couple of specific applications are described below.

Figure 1:
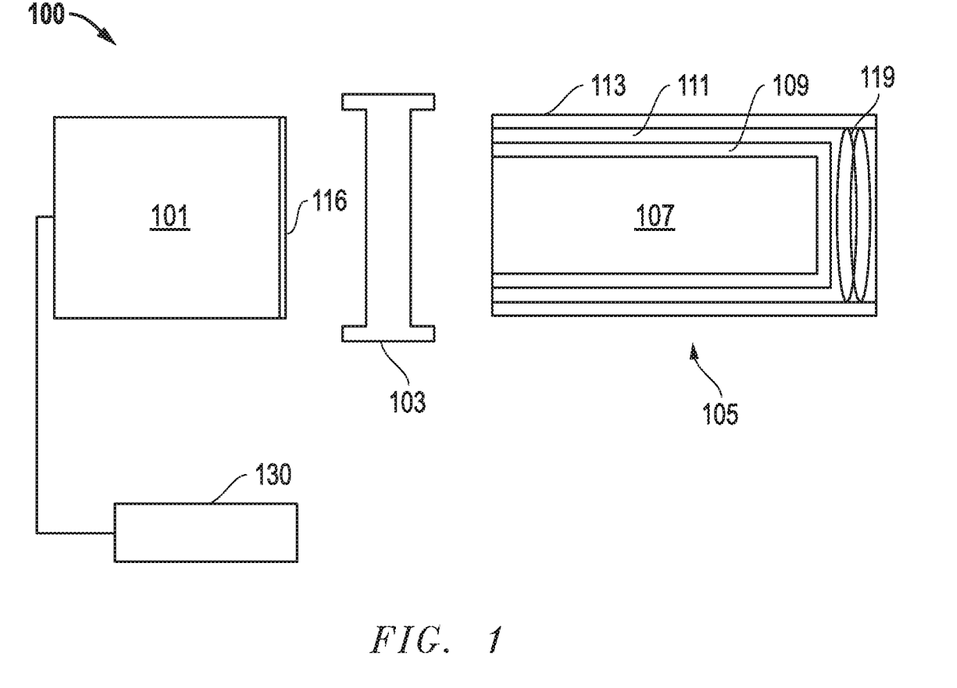
FIG. 1 includes an illustration of a radiation detection apparatus in accordance with an embodiment that can be used in medical imaging.

FIG. 1 illustrates an embodiment of a radiation detection apparatus 100 that can be used for gamma ray analysis, such as a Single Positron Emission Computer Tomography (SPECT) or Positron Emission Tomography (PET) analysis. In the embodiment illustrated, the radiation detection apparatus 100 includes a photosensor 101, an optical interface 103, and a scintillation device 105. Although the photosensor 101, the optical interface 103, and the scintillation device 105 are illustrated separate from each other, skilled artisans will appreciate that photosensor 101 and the scintillation device 105 can be coupled to the optical interface 103, with the optical interface 103 disposed between the photosensor 101 and the scintillation device 105. The scintillation device 105 and the photosensor 101 can be optically coupled to the optical interface 103 with other known coupling methods, such as the use of an optical gel or bonding agent, or directly through molecular adhesion of optically coupled elements.

The photosensor 101 may be a photomultiplier tube (PMT), a semiconductor-based photomultiplier, or a hybrid photosensor. The photosensor 101 can receive photons emitted by the scintillation device 105, via an input window 116, and produce electrical pulses based on numbers of photons that it receives. The photosensor 101 is electrically coupled to an electronics module 130. The electrical pulses can be shaped, digitized, analyzed, or any combination thereof by the electronics module 130 to provide a count of the photons received at the photosensor 101 or other information. The electronics module 130 can include an amplifier, a pre-amplifier, a discriminator, an analog-to-digital signal converter, a photon counter, a pulse shape analyzer or discriminator, another electronic component, or any combination thereof. The photosensor 101 can be housed within a tube or housing made of a material capable of protecting the photosensor 101, the electronics module 130, or a combination thereof, such as a metal, metal alloy, other material, or any combination thereof.

The scintillation device 105 includes a scintillation crystal 107 can be any one of the scintillation crystals previously described that are represented by a general formula of NaX:Tl, Me, wherein X represents a halogen, and Me represents a Group 1 element, a Group 2 element, a rare earth element, or any combination thereof. The scintillation crystal 107 is substantially surrounded by a reflector 109. In one embodiment, the reflector 109 can include polytetrafluoroethylene (PTFE), another material adapted to reflect light emitted by the scintillation crystal 107, or a combination thereof. In an illustrative embodiment, the reflector 109 can be substantially surrounded by a shock absorbing member 111. The scintillation crystal 107, the reflector 109, and the shock absorbing member 111 can be housed within a casing 113.

The scintillation device 105 includes at least one stabilization mechanism adapted to reduce relative movement between the scintillation crystal 107 and other elements of the radiation detection apparatus 100, such as the optical interface 103, the casing 113, the shock absorbing member 111, the reflector 109, or any combination thereof. The stabilization mechanism may include a spring 119, an elastomer, another suitable stabilization mechanism, or a combination thereof. The stabilization mechanism can be adapted to apply lateral forces, horizontal forces, or a combination thereof, to the scintillation crystal 107 to stabilize its position relative to one or more other elements of the radiation detection apparatus 100.

As illustrated, the optical interface 103 is adapted to be coupled between the photosensor 101 and the scintillation device 105. The optical interface 103 is also adapted to facilitate optical coupling between the photosensor 101 and the scintillation device 105. The optical interface 103 can include a polymer, such as a silicone rubber, that is polarized to align the reflective indices of the scintillation crystal 107 and the input window 116. In other embodiments, the optical interface 103 can include gels or colloids that include polymers and additional elements.

Figure 2:
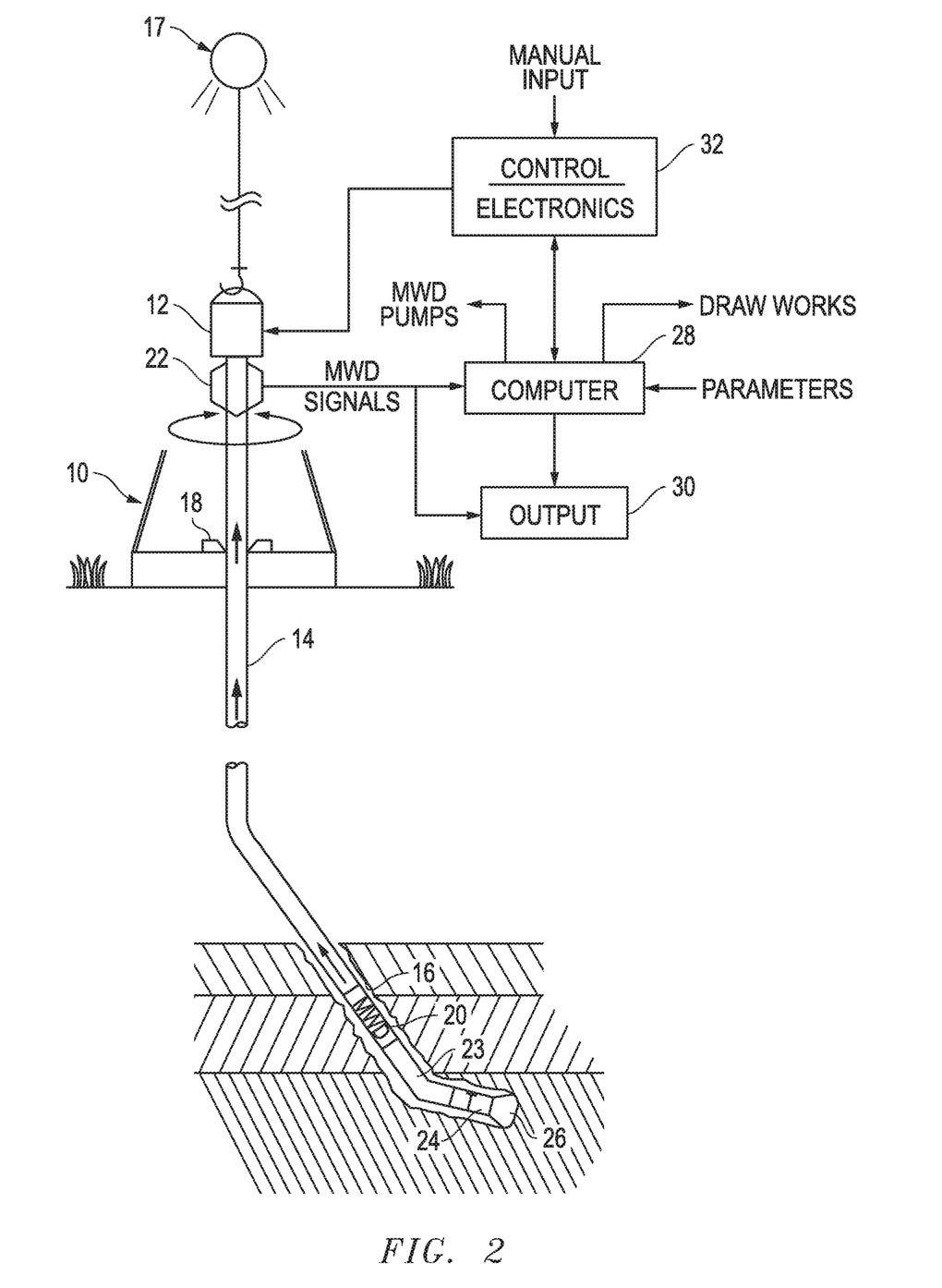
FIGS. 2 and 3 include illustrations of a radiation detection apparatus in accordance with an embodiment that can be used in drilling or well logging.

The scintillation crystal can be used in a well logging application. FIG. 2 includes a depiction of a drilling apparatus 10 includes a top drive 12 connected to an upper end of a drill string 14 that is suspended within a well bore 16 by a draw works 17. A rotary table, including pipe slips, 18 can be used to maintain proper drill string orientation in connection with or in place of the top drive 12. A downhole telemetry measurement and transmission device 20, commonly referred to as a measurement-while-drilling (MWD) device, is part of a downhole tool that is connected to a lower end of the drill string 14. The MWD device transmits drilling-associated parameters to the surface by mud pulse or electromagnetic transmission. These signals are received at the surface by a data receiving device 22. The downhole tool includes a bent section 23, a downhole motor 24, and a drill bit 26. The bent section 23 is adjacent the MWD device for assistance in drilling an inclined well bore. The downhole motor 24, such as a positive-displacement-motor (PDM) or downhole turbine, powers the drill bit 26 and is at the distal end of the downhole tool.

The downhole signals received by the data reception device 22 are provided to a computer 28, an output device 30, or both. The computer 28 can be located at the well site or remotely linked to the well site. An analyzer device can be part of the computer 28 or may be located within the downhole tool near the MWD device 20. The computer 28 and analyzer device can include a processor that can receive input from a user. The signals are also sent to an output device 30, which can be a display device, a hard copy log printing device, a gauge, a visual audial alarm, or any combination thereof. The computer 28 is operatively connected to controls of the draw works 17 and to control electronics 32 associated with the top drive 12 and the rotary table 18 to control the rotation of the drill string and drill bit. The computer 28 may also be coupled to a control mechanism associated with the drilling apparatus's mud pumps to control the rotation of the drill bit. The control electronics 32 can also receive manual input, such as a drill operator.

Figure 3:
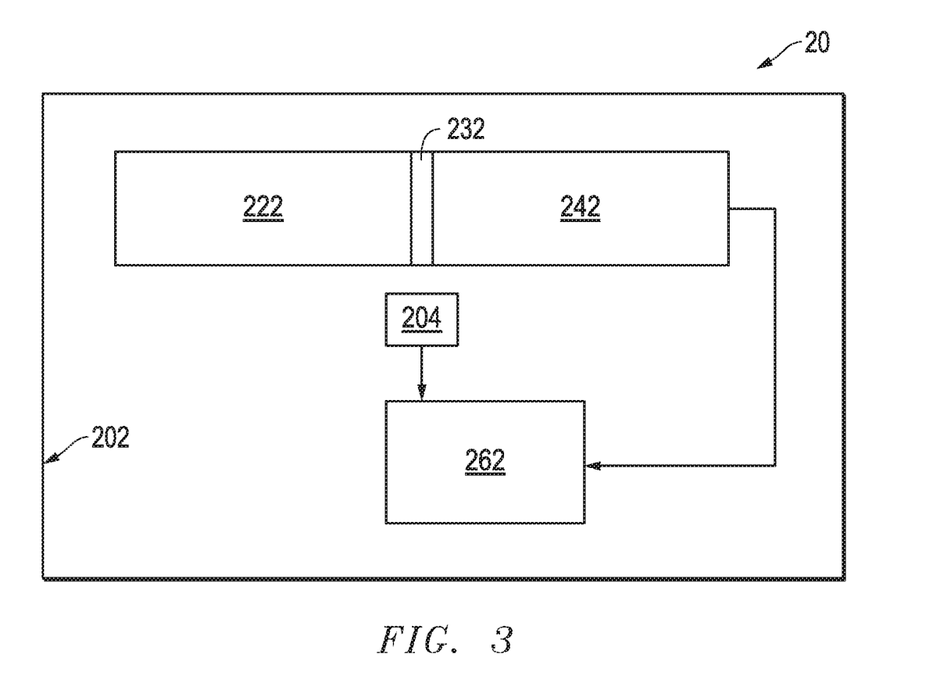

FIG. 3 illustrates a depiction of a portion of the MWD device 20 within the downhole tool 16. The MWD device 20 includes a housing 202, a temperature sensor 204, a scintillation crystal 222, an optical interface 232, a photosensor 242, and an analyzer device 262. The housing 202 can include a material capable of protecting the scintillation crystal 222, the photosensor 242, the analyzer device 262, or a combination thereof, such as a metal, metal alloy, other material, or any combination thereof. The temperature sensor 204 is located adjacent to the scintillation crystal 222, the photosensor 242, or both. The temperature sensor 204 can include a thermocouple, a thermistor, or another suitable device that is capable of determining the temperature within the housing over the normal operating temperature of the MWD device 20. A radiation detection apparatus includes the scintillation crystal 222 that is optically coupled to the photosensor 242 that is coupled to the analyzer device 262.

The scintillation crystal 222 has a composition that is well suited for high temperature applications, such as greater than 120° C., at least 130° C., at least 140° C., at least 150° C., and higher. In an embodiment, the scintillation crystal 222 can be any one of the scintillation crystals previously described that are represented by a general formula of NaX:Tl, Me, wherein X represents a halogen, and Me represents a Group 1 element, a Group 2 element, a rare earth element, or any combination thereof.

In another embodiment, a radiation detection apparatus with the scintillation crystal as described herein may be configured for another application. In a particular embodiment, the radiation detection apparatus may be configured for use in prompt gamma neutron activation analysis. The decreased pulse decay time may allow for a simpler design for the radiation detection apparatus. In particular, a scintillator crystal without the co-dopant may need to be heated (above room temperature) to achieve a desired pulse decay time. A heater can complicate the design of the radiation detection apparatus and may cause undesired noise. With the co-doping, the pulse decay time may be sufficiently fast at room temperature (for example, 22° C.), thus, obviating the need for a heater and simplifying the design.

In a further embodiment, the actual light yield from a scintillation event can be adjusted to improve energy resolution. The concentration of a dopant within a scintillation crystal may vary throughout the crystal, and the concentration of the dopant can affect the decay time and the light yield of the scintillation crystal. Thus, the decay time and light yield can depend on the location where the gamma ray energy is captured within the scintillation crystal. Because light yield is used to determine the energy of the interacting gamma ray, there could be a variation in the energy measurement. In other words, the energy resolution would be poor. In a further embodiment, the actual light yield can be adjusted for the variation in light yield based on the pulse decay time. The method described below is particularly well used for a co-dopant, such as Ca, Sr, Ba, La, or any other co-dopant whose decay time is dependent on the concentration of the co-dopant.

Before the adjustment, an equation correlating pulse decay time to light yield is generated. Data can be collected for different dopant concentrations of the co-dopant within a scintillation crystal when detecting radiation a particular gamma ray source, for example, $^{137}Cs$, which emits gamma radiation at an energy of 662 keV. A plot of decay time versus light yield provides a linear relationship between the scintillation light yield and the decay time. The pulse decay time is the time interval between the moment of the peak photon flux in each pulse and the moment when photon flux has fallen to a factor of 1/e (36.8%) of the peak photon flux. Thus, a least squares fit of data corresponding to the plot can produce Equation 1 below.

$$LY_{est}=m*DT+b \quad \text{(Equation 1)}$$

where:
$LY_{est}$ is the estimated light yield,
DT is the pulse decay time,
m is the slope of the line, and
b is the y-axis intercept of the line.

Figure 7:
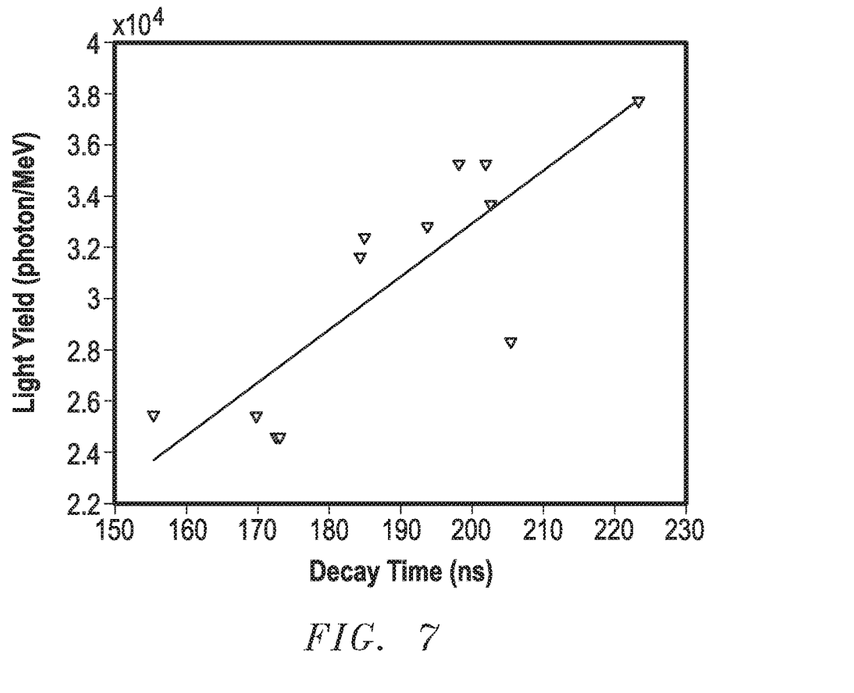
FIG. 7 includes a plot of scintillation light yield versus pulse decay time for NaI:Tl crystals co-doped with different concentrations of Ca.

As a non-limiting example, FIG. 7 includes a plot of scintillation light yield versus pulse decay time for NaI:Tl crystals co-doped with Ca (triangle symbols). The data in FIG. 7 was generated from samples in which the concentration of Ca in the NAI:Tl crystals is different in each sample. The ordinate of the plot is scintillation light yield in units of photons/MeV of gamma ray energy. The abscissa is the scintillation pulse decay time in units of nanoseconds. Referring to FIG. 7, the straight line is a least squares fit to the data, and the equation for this line is $$LY_{est}=206.28*DT-8360.3 \quad \text{(Equation 2)}$$

where:
$LY_{est}$ is the estimated light yield in photons/MeV, and
DT is the pulse decay time in nanoseconds.

If needed or desired, different equations may be generated for different co-dopants, different radiation sources, or both. The equations would be of the same format as Equation 1 and may have different values for m and b for the different co-dopants, radiation sources, or both.

After the values for m and b for Equation 1 have been generated, actual measurements of pulse decay time and light yield for a subsequent scintillation event can be determined. The pulse decay time can be used to determine the estimated light yield in accordance with Equation 1.

The actually measured light yield can be adjusted by the ratio of the light yield for a scintillator of the same composition without the co-dopant, that is NaX:Tl, using Equation 3 below.

$$LY_{adj}=LY_{act}*LY_{std}/LY_{est} \quad \text{(Equation 3)}$$

where:
$LY_{adj}$ is the adjusted light yield,
$LY_{act}$ is the light yield as measured,
$LY_{std}$ is the light yield of a scintillation crystal without a co-dopant, for example NaI:Tl, and
$LY_{est}$ is the estimated light yield calculated based on the measured pulse decay time.

$LY_{std}$ can have a previously known value or may be calculated using the pulse decay time for a scintillation crystal without a co-dopant. For NaI:Tl, the pulse decay time can be 230 ns, and Equation 2 can be used to determine $LY_{std}$.

The adjustment allows the light yield of each individual pulse to be scaled by a compensation factor to reduce the variation in the measured light yield within the same crystal or between different crystals having different co-dopant content. This process can improve the energy resolution of the crystal. Accordingly, a radiation source may be identified more quickly and accurately, as compared to using the actual measurement without the adjustment.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A scintillation crystal comprising NaX:Tl, Me, wherein:
X represents a halogen;
Me represents a Group 1 element, a Group 2 element, a rare earth element, or any combination thereof;
each of Tl and Me has a dopant concentration of at least $1\times10^{-5}$ mol %; and
the scintillation crystal has a property including:
for radiation in a range of 300 nm to 700 nm, an emission maximum at a wavelength no greater than 430 nm;
an energy resolution less than 6.4% when measured at 662 keV, 22° C., and an integration time of 1 microsecond; or
a pulse decay time that is less than another scintillation crystal that has a composition of NaX:Tl.

Embodiment 2. The scintillation crystal of Embodiment 1, wherein Me is a rare earth element.

Embodiment 3. The scintillation crystal of Embodiment 2, wherein Me is La, Sc, Y, Lu, Yb, or any combination thereof.

Embodiment 4. The scintillation crystal of Embodiment 2 or 3, wherein Me has a dopant concentration of at least $5\times10^{-4}$ mol % or at least $8\times10^{-4}$ mol %.

Embodiment 5. The scintillation crystal of any one of Embodiments 2 to 4, wherein Me has a dopant concentration no greater than 0.9 mol %, 0.05 mol %, or $5\times10^{-3}$ mol %.

Embodiment 6. The scintillation crystal of Embodiment 1, wherein Me is a Group 1 element.

Embodiment 7. The scintillation crystal of Embodiment 1, wherein Me is a Group 2 dopant.

Embodiment 8. The scintillation crystal of Embodiment 7, wherein Me is Ca, Sr, or any combination thereof.

Embodiment 9. A scintillation crystal comprising NaX:Tl, Sr, wherein:
X represents a halogen; and
each of Tl and Sr has a concentration of at least $1\times10^{-5}$ mol %.

Embodiment 10. The scintillation crystal of Embodiment 9, wherein the scintillation crystal has a greater light yield as compared to a NAI:Tl crystal when the scintillation crystal and the NAI:Tl crystal are measured at 22° C.

Embodiment 11. A scintillation crystal comprising NaX: Tl, Ca, wherein:
X represents a halogen;
each of Tl and Ca have a concentration of at least $1\times10^{-5}$ mol %; and
the scintillation crystal has a greater light yield, a shorter pulse decay time, or both as compared to a NAI:Tl crystal when the scintillation crystal and the NAI:Tl crystal are measured at 22° C.

Embodiment 12. A scintillation crystal comprising NaX: Tl, $Me^{2+}$, and RE, wherein:
X represents a halogen;
$Me^{2+}$ represents a divalent metal element;
RE represents a rare earth element; and
each of Tl and Sr has a concentration of at least $1\times10^{-5}$ mol %.

Embodiment 13. The scintillation crystal of Embodiment 12, wherein $Me^{2+}$ is Ca, Sr, or any combination thereof; and RE is La, Sc, Y, Lu, Yb, or any combination thereof.

Embodiment 14. A scintillation crystal comprising NaX: Tl, Me, wherein:
X represents a halogen;
Me represents a Group 1 element and has a concentration in a range of $1\times10^{-5}$ mol % to 9 mol %.

Embodiment 15. The scintillation crystal of Embodiment 6 or 14, wherein Me is Rb, Cs, or any combination thereof.

Embodiment 16. The scintillation crystal of any one of Embodiments 6 to 15, wherein the Group 1 element, the Group 2 element, Sr, Ca, $Me^{2+}$ or RE has a concentration of at least $1\times10^{-4}$ mol %, at least $1\times10^{-3}$ mol %, or at least 0.01 mol %.

Embodiment 17. The scintillation crystal of any one of Embodiments 6 to 16, wherein the Group 1 element, the Group 2 element, Sr, Ca, $Me^{2+}$ or RE has a concentration no greater than 5 mol %, no greater than 0.9 mol %, or no greater than 0.2 mol %.

Embodiment 18. The scintillation crystal of any one of Embodiments 6 to 17, wherein the Group 1 element, the Group 2 element, Sr, Ca, $Me^{2+}$ or RE has a concentration in a range of $1\times10^{-4}$ mol % to 5 mol %, $1\times10^{-3}$ mol % to 0.9 mol %, or 0.01 mol % to 0.2 mol %.

Embodiment 19. The scintillation crystal of any one of the preceding Embodiments, wherein Tl has a concentration of at least $1\times10^{-4}$ mol %, at least $1\times10^{-3}$ mol %, or at least 0.01 mol %.

Embodiment 20. The scintillation crystal of any one of the preceding Embodiments, wherein Tl has a concentration no greater than 5 mol %, no greater than 0.9 mol %, or no greater than 0.2 mol %.

Embodiment 21. The scintillation crystal of any one of the preceding Embodiments, wherein Tl has a concentration in a range of $1\times10^{-4}$ mol % to 5 mol %, $1\times10^{-3}$ mol % to 0.9 mol %, or 0.01 mol % to 0.2 mol %.

Embodiment 22. The scintillation crystal of any one of the preceding Embodiments, wherein X is I.

Embodiment 23. The scintillation crystal of any one of Embodiments 1 to 21, wherein X is a combination of I and Br.

Embodiment 24. The scintillation crystal of Embodiment 23, wherein X includes at least 50 mol %, at least 70 mol %, or at least 91 mol % I.

Embodiment 25. The scintillation crystal of any one of the preceding Embodiments, wherein for radiation in a range of 300 nm to 700 nm, the scintillation crystal has an emission maximum at a wavelength of at least 400 nm, at least 405 nm, or at least 410 nm when the scintillation crystal is exposed to gamma radiation having an energy of 60 keV.

Embodiment 26. The scintillation crystal of any one of the preceding Embodiments, wherein for radiation in a range of 300 nm to 700 nm, the scintillation crystal has an emission maximum at a wavelength no greater than 430 nm, no greater than 425 nm, or no greater than 420 nm when the scintillation crystal is exposed to gamma radiation having an energy of 60 keV.

Embodiment 27. The scintillation crystal of any one of the preceding Embodiments, wherein for radiation in a range of 300 nm to 700 nm, the scintillation crystal has an emission maximum at a wavelength in a range of 400 nm to 430 nm, 405 nm to 425 nm, or 410 nm to 420 nm when the scintillation crystal is exposed to gamma radiation having an energy of 60 keV.

Embodiment 28. The scintillation crystal of any one of the preceding Embodiments, wherein the scintillation crystal has an energy resolution less than 6.4%, less than 6.2%, less than 6.0%, or less than 5.5% when measured at 662 keV, 22° C., and an integration time of 1 microsecond.

Embodiment 29. The scintillation crystal of any one of the preceding Embodiments, wherein the scintillation crystal has an energy resolution less than 6.1%, less than 6.0%, or less than 5.9% when measured at 662 keV, 22° C., and any integration time in a range of 1 microsecond to 4 microseconds.

Embodiment 30. The scintillation crystal of any one of the preceding Embodiments, wherein at energies in the range of 32 keV to 81 keV, the scintillation crystal has an average relative light yield as normalized to a light yield at 2615 keV of at least 1.01, at least 1.04, or at least 1.07.

Embodiment 31. The scintillation crystal of any one of the preceding Embodiments, wherein at energies in the range of 32 keV to 81 keV, the scintillation crystal has an average relative light yield as normalized to a light yield at 2615 keV of no greater than 1.15, no greater than 1.13, or no greater than 1.11.

Embodiment 32. The scintillation crystal of any one of the preceding Embodiments, wherein at energies in the range of 32 keV to 81 keV, the scintillation crystal has an average relative light yield as normalized to a light yield at 2615 keV that is in a range of 1.01 to 1.15, 1.04 to 1.13, or 1.07 to 1.11.

Embodiment 33. The scintillation crystal of any one of the preceding Embodiments, wherein at energies in the range of 122 keV to 511 keV, the scintillation crystal has an average relative light yield as normalized to a light yield at 2615 keV of at least 1.01, at least 1.02, or at least 1.03.

Embodiment 34. The scintillation crystal of any one of the preceding Embodiments, wherein at energies in the range of 122 keV to 511 keV, the scintillation crystal has an average relative light yield as normalized to a light yield at 2615 keV no greater than 1.07, no greater than 1.06, or no greater than 1.05.

Embodiment 35. The scintillation crystal of any one of the preceding Embodiments, wherein at energies in the range of 122 keV to 511 keV, the scintillation crystal has an average relative light yield as normalized to a light yield at 2615 keV that is in a range of 1.01 to 1.07, 1.02 to 1.06, or 1.03 to 1.05.

Embodiment 36. The scintillation crystal of any one of Embodiments 30 to 35, wherein the relative light yield at a particular energy (in units of keV), as normalized to the light yield at 2615 keV, is:

$$\text{relative light yield} = \frac{\text{actual light yield}}{\text{predicted light yield}},$$

where the actual light yield is at the particular energy, and the predicted light yield is:

$$\text{predicted light yield} = \frac{\text{particular energy}}{2615 \text{ keV}} \times LY_{2615},$$

where $LY_{2615}$ is the actual light yield at 2615 keV.

Embodiment 37. The scintillation crystal of any one of Embodiments 30 to 36, wherein the average relative light yield is an integral of the relative light yield over a particular energy range divided by the particular energy range.

Embodiment 38. The scintillation crystal of any one of the preceding Embodiments, wherein the scintillation crystal has a pulse decay time that is at least 5%, at least 11%, or at least 20% less than a pulse decay time a NaI:Tl crystal when the scintillation crystal and the NaI:Tl crystal are measured at 22° C. and exposed to gamma radiation having an energy of 662 keV.

Embodiment 39. The scintillation crystal of any one of the preceding Embodiments, wherein the scintillation crystal has a pulse decay time that is no greater than 80%, no greater than 65%, or no greater than 50% less than a pulse decay time of NaI:Tl crystal when the scintillation crystal and the NAI:Tl crystal are measured at 22° C. and exposed to gamma radiation having an energy of 662 keV.

Embodiment 40. The scintillation crystal of any one of the preceding Embodiments, wherein the scintillation crystal has a pulse decay time that is in a range of 5% to 80%, 11% to 65%, or 20% to 50% less than a pulse decay of a NaI:Tl crystal when the scintillation crystal and the NAI:Tl crystal are measured at 22° C. and exposed to gamma radiation having an energy of 662 keV.

Embodiment 41. The scintillation crystal of any one of the preceding Embodiments, wherein the scintillation crystal is monocrystalline.

Embodiment 42. A radiation detection apparatus comprising:

the scintillation crystal of any one of the preceding Embodiments; and a photosensor optically coupled to the scintillation crystal.

Embodiment 43. The radiation detection apparatus of Embodiment 42, further comprising a window disposed between the scintillation crystal and the photosensor;

Embodiment 44. The radiation detection apparatus of Embodiment 42 or 43, further comprising a clear adhesive attached to a surface of the scintillation crystal closest to the photosensor.

Embodiment 45. The radiation detection apparatus of any one of Embodiments 42 to 44, wherein the radiation detection apparatus is configured to perform prompt gamma neutron activation analysis.

Embodiment 46. A method comprising:

providing the scintillation crystal of any one of the preceding Embodiments;

capturing radiation within the scintillation crystal;

determining a pulse decay time and an actual light yield of the radiation captured;

determining an estimated light yield corresponding to the pulse decay time; and calculating an adjusted light yield that is a product of the actual light yield times the light yield of NaX:Tl divided by the estimated light yield.

EXAMPLES

The concepts described herein will be further described in the Examples, which do not limit the scope of the invention described in the claims. The Examples demonstrate performance of scintillation crystals of different compositions. Numerical values as disclosed in this Examples section may be averaged from a plurality of readings, approximated, or rounded off for convenience. Samples were formed using a vertical Bridgman crystal growing technique.

Scintillation crystals were formed to compare light yield (PH) and energy resolution (PHR) of the co-doped samples to a NaI:Tl standard. The compositions of the scintillation crystals are listed in Table 1. Testing was performed at room temperature (approximately 22° C.) by exposing the scintillation crystals to $^{137}$Cs and using a photomultiplier tube and multichannel analyzer to obtain a spectrum.

TABLE 1

Standard, Sr, and La Compositions

| Sample | TlI (mol %) | SrI$_2$ (mol %) | LaI$_3$ (mol %) |
| --- | --- | --- | --- |
| NaI:Tl (standard) | 0.1000 | — | — |
| NaI:Tl, Sr | 0.05 | 0.11 | — |
| NaI:Tl, La | 0.0880 | — | 8.6 × 10$^{-5}$ |

Figure 4:
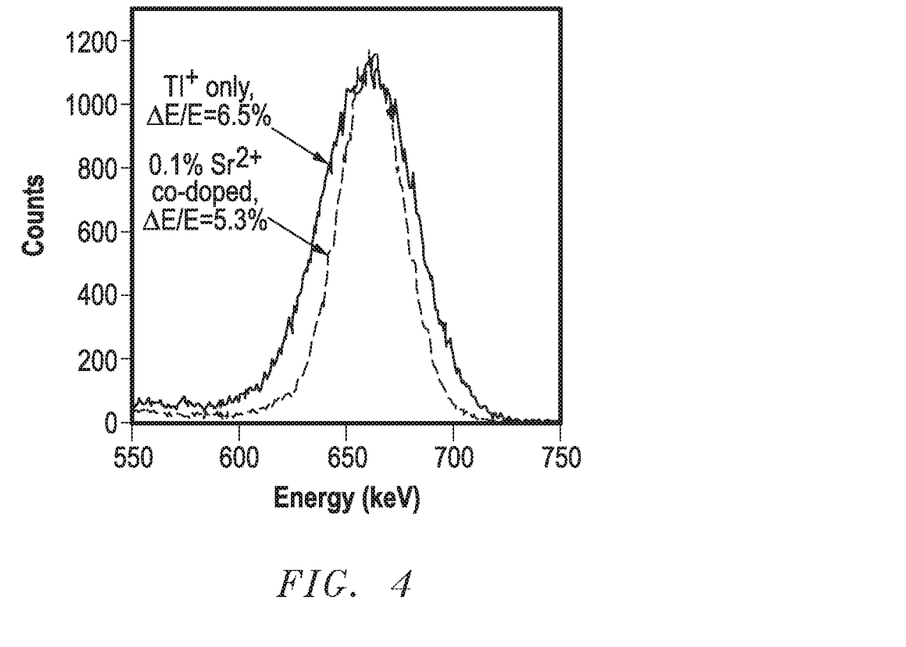
FIG. 4 includes obtained for a Sr co-doped and standard sample when exposed to gamma radiation at an energy of 662 keV at room temperature and a pulse integration of 1 microsecond.
Figure 5:
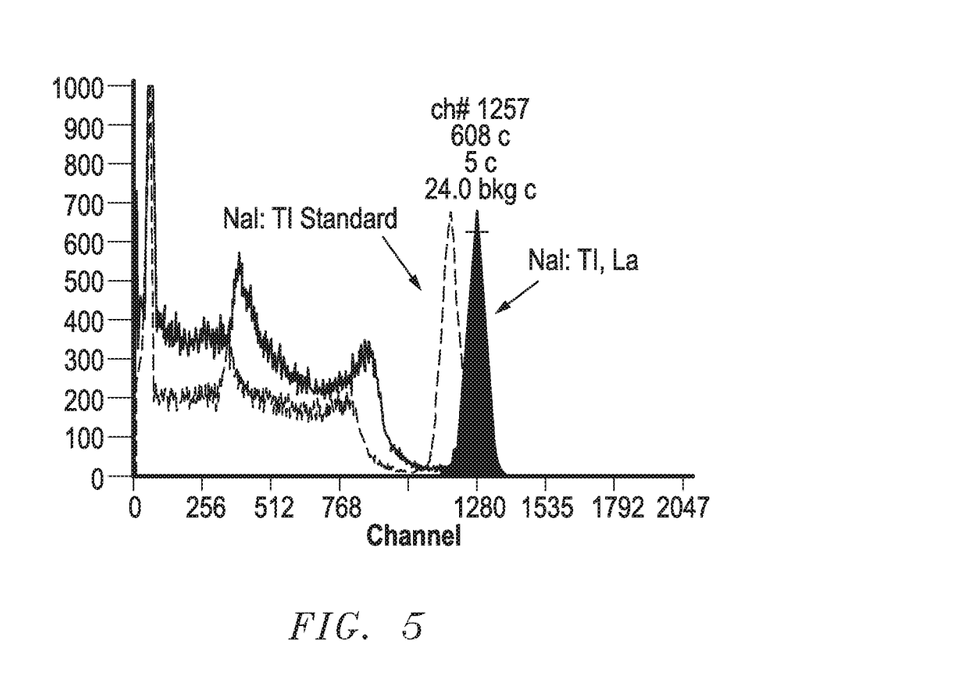
FIG. 5 includes obtained for a La co-doped and standard sample when exposed to gamma radiation at an energy of 662 keV at room temperature and a pulse integration of 1 microsecond.

FIGS. 4 and 5 include spectra that compare the NaI:Tl standard to the Sr and La co-doped samples. Energy resolution was performed with a 1 microsecond integration time. As can be seen in FIG. 4, the Sr co-doped sample has significantly better energy resolution of about 5.3%, as compared to the NaI:Tl standard, which is approximately 6.5%. The La co-doped sample has light yield that is about 109% of the light yield of the NaI:Tl standard (i.e., 9% more light yield).

Ca co-doped samples were also compared to the NaI:Tl standard. Table 2 includes the crystal compositions. The Ca #1, Ca #2, and Ca #3 samples correspond to locations near the top, middle, and bottom, respectively, of the Ca co-doped crystal. Testing was performed at room temperature (approximately 22° C.) by exposing the scintillation crystals to $^{137}$Cs and using a photomultiplier tube and multichannel analyzer to obtain a spectrum.

TABLE 2

Standard and Ca Compositions

| Sample | TlI (mol %) | CaI$_2$ (mol %) |
| --- | --- | --- |
| NaI:Tl (standard) | 0.100 | — |
| NaI:Tl, Ca #1 | 0.06 | 0.09 |
| NaI:Tl, Ca #2 | 0.03 | 0.21 |
| NaI:Tl, Ca #3 | 0.07 | 0.47 |

Table 3 includes light yield (PH) and energy resolution (PHR) for the samples when using integration times of 1, 2, and 4 microseconds. For PH, light yield of the Ca co-doped samples were compared to the light yield of the NaI:Tl standard.

TABLE 3

PH and PHR for Ca Co-Doped Samples

| Sample | PH (%) | PHR (%) |
| --- | --- | --- |
| NaI:Tl | 100 | 6.4% |
| NaI:Tl, Ca #1 | 78 | 5.9% |
| NaI:Tl, Ca #2 | 83 | 5.4% |
| NaI:Tl, Ca #3 | 88 | 5.6% |

The best pulse height resolution with the Ca co-doped sample is 5.4%. Further work may be performed to determine whether the Ca concentration, relative Ca to Tl concentrations, or both have a significant impact on the energy resolution. For example, a Ca concentration of at 0.09 mol % to 0.47 mol % or a ratio of Ca:Tl of 1.5 to 7.0 may provide better energy resolution for a Ca co-doped sample as compared to another Ca co-doped sample outside either or both of the ranges. Further studies can help to provide a better insight as to effects of concentrations on energy resolution.

Proportionality was tested by comparing the Sr and Ca co-doped samples to the NaI:Tl standard. Table 4 includes the crystal compositions. The Sr #1, Sr #2, and Sr #3 samples correspond to locations near the top, middle, and bottom, respectively, of the Sr co-doped crystal.

TABLE 4

Standard, Sr, and Ca Compositions

| Sample | TlI (mol %) | SrI2 (mol %) | CaI$_2$ (mol %) |
| --- | --- | --- | --- |
| NaI:Tl (standard) | 0.100 | — | — |
| NaI:Tl, Sr #1 | 0.05 | 0.11 | — |
| NaI:Tl, Sr #2 | 0.029 | 0.135 | — |
| NaI:Tl, Sr #3 | 0.030 | 0.137 | — |
| NaI:Tl, Ca | 0.053 | — | 0.020 |

For each of the samples, light yield data was collected at a plurality of different energies by exposing the samples to different radiation sources that emit different energies. Each sample was normalized to the light yield at 2615 keV for the same sample. The relative light yield at a particular energy (in units of keV), as normalized to the light yield at 2615 keV, is:

$$\text{relative light yield} = \frac{\text{actual light yield}}{\text{predicted light yield}},$$

where the actual light yield is at the particular energy, and the predicted light yield is:

$$\text{predicted light yield} = \frac{\text{particular energy}}{2615 \text{ keV}} \times LY_{2615},$$

where $LY_{2615}$ is the actual light yield at 2615 keV. Ideally, the plots should have all points at 1.00. The average relative light yield was obtained by integrating the relatively light yield over a particular energy range to obtain an integrated value, and dividing the integrated value by the particular energy range.

Figure 6:
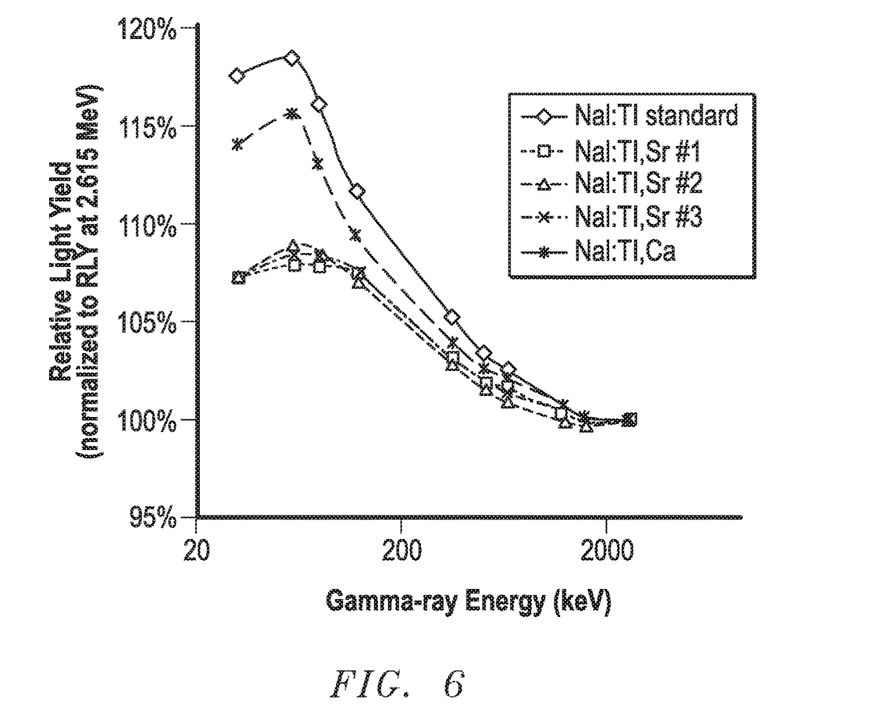
FIG. 6 includes a plot of relative light yield as a function of energy for Sr co-doped, Ca co-doped, and standard samples.

FIG. 6 includes a plot of relative light yield as a function of energy for the samples. As can be seen in FIG. 6, proportionality becomes worse as the energy decreases. The Sr co-doped samples have the best proportionality as compared to the Ca co-doped and standard samples. The improvement is very apparent at low energy. The average light yield for the Sr co-doped samples is approximately 1.09 at energies in a range of 32 keV to 81 keV. For the same energy range, the Ca-doped sample (approximately 1.15) showed improvement over the standard sample (approximately 1.16). An improvement can still be seen at intermediate energies. For energies in the range of 122 keV to 511 keV, the Sr co-doped samples had a relatively light yield of approximately 1.04, the Ca co-doped sample had a relatively light yield of approximately 1.06, the standard sample had a relatively light yield of approximately 1.07.

Single crystals from melts that included NaI, Tl at 0.1 atomic % with respect to NaI, with or without co-doping. When co-doped, Ca$^{2+}$ was present at 0.1, 0.3, and 0.6 atomic %, and Sr$^{2+}$ was present at 0.05, 0.1, 0.2, and 0.4 atomic %. Crystals formed from the melts had the compositions as listed below in Table 5.

TABLE 5

Crystal Compositions

| Co-doping[a] | [Tl+][b] | [Sr$^{2+}$][b] or [Ca$^{2+}$][b] |
|---|---|---|
| Tl+ only | 0.08 ± 0.03% | 0 |
| 0.05% Sr$^{2+}$ | 0.08 ± 0.05% | 0.05 ± 0.02% |
| 0.1% Sr$^{2+}$ | 0.05 ± 0.02% | 0.11 ± 0.01% |
| 0.2% Sr$^{2+}$ | 0.06 ± 0.04% | 0.18 ± 0.01% |
| 0.4% Sr$^{2+}$ | 0.09 ± 0.06% | 0.52 ± 0.08% |
| 0.1% Ca$^{2+}$ | 0.06 ± 0.03% | 0.09 ± 0.03% |
| 0.3% Ca$^{2+}$ | 0.03 ± 0.01% | 0.21 ± 0.03% |
| 0.6% Ca$^{2+}$ | 0.07 ± 0.02% | 0.47 ± 0.02% |

[a] atomic % in the melt, with respect to Na+.
[b] Measured in grown crystal with inductively coupled plasma-Optical emission spectrometry (ICP-OES); in atomic %.

The crystals were tested for decay times, which were determined by fitting averaged traces corresponding to 662 keV photopeaks with exponential decay functions. Thirty traces were averaged for each measurement. Scintillation pulses were fitted with double exponential decay functions. A summary of fast and slow decay times is listed in Table 6.

TABLE 6

Decay Components for Crystals

| Co-doping | $\tau_{primary}$ (ns) | $\tau_{secondary}$ (ns) |
|---|---|---|
| Tl+ only | 220 ± 10[a] (96%)[b] | 1500 ± 200 (4%) |
| 0.05% Sr$^{2+}$ | 201 ± 21 (94%) | 860 ± 240 (6%) |
| 0.1% Sr$^{2+}$ | 172 ± 10 (92%) | 860 ± 160 (8%) |
| 0.2% Sr$^{2+}$ | 195 ± 16 (96%) | 690 ± 90 (4%) |
| 0.4% Sr$^{2+}$ | 195 ± 7 (96%) | 1000 ± 300 (4%) |
| 0.1% Ca$^{2+}$ | 199 ± 10 (95%) | 1030 ± 150 (5%) |
| 0.3% Ca$^{2+}$ | 173 ± 12 (94%) | 830 ± 230 (6%) |
| 0.6% Ca$^{2+}$ | 186 ± 11 (94%) | 870 ± 110 (6%) |

[a] Uncertainties are the standard deviations of measured results of samples from the same crystal ingot.
[b] The values in the parenthesis are the percentage of total scintillation light in the specific decay component. Uncertainties are 1-2%.

On average, co-doped crystals with 0.1% Sr$^{2+}$ and 0.3% Ca$^{2+}$ show the shortest decay among their peers. Both show an exceptionally fast primary decay time of about 170 ns, which is over 20% faster than that of standard NaI:Tl+. The fastest decay recorded is for a sample from the 0.3% Ca$^{2+}$ co-doped crystal. The sample shows decay times of 155 ns (92%)+530 ns (8%).

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A scintillation crystal comprising NaX:Tl, Ca, wherein:
   X represents a halogen;
   Tl has a concentration of at least 1×10$^{-5}$ mol %;
   a ratio of Ca:Tl is in a range of 1.5 to 7.0; and
   the scintillation crystal has a pulse decay time that is no more than 80% less than a pulse decay time of a NAI:Tl crystal when the scintillation crystal and the NAI:Tl crystal are measured at 22° C. and exposed to gamma radiation having an energy of 662 keV.

2. The scintillation crystal of claim 1, wherein Ca has a concentration no greater than 5 mol %.

3. The scintillation crystal of claim 1, wherein the scintillation crystal has an energy resolution less than 6.4% when measured at 662 keV, 22° C., and an integration time of 1 microsecond.

4. The scintillation crystal of claim 1, wherein at energies in the range of 32 keV to 81 keV, the scintillation crystal has an average relative light yield as normalized to a light yield at 2615 keV of no greater than 1.15.

5. The scintillation crystal of claim 1, wherein at energies in the range of 122 keV to 511 keV, the scintillation crystal has an average relative light yield as normalized to a light yield at 2615 keV no greater than 1.07.

6. The scintillation crystal of claim 1, wherein Ca has a concentration in a range of 0.01 mol % to 0.9 mol %.

7. The scintillation crystal of claim 6, wherein Tl has a concentration in a range of 1×10$^{-4}$ mol % to 0.2 mol %.

8. The scintillation crystal of claim 1, wherein the pulse decay time is at least 11% less than the pulse decay time of the NaI:Tl crystal when the scintillation crystal and the NAT' crystal are measured at 22° C. and exposed to gamma radiation having the energy of 662 keV.

9. The scintillation crystal of claim 1, wherein the scintillation crystal is part of a well logging device or medical imaging device.

10. The scintillation crystal of claim 1, wherein the pulse decay time is no more than 65% less than the pulse decay time of the NaI:Tl crystal.

11. The scintillation crystal of claim 1, wherein the pulse decay time is no more than 50% less than the pulse decay time of the NaI:Tl crystal.

12. A method comprising;
   providing the scintillation crystal of claim 1;
   capturing radiation within the scintillation crystal;
   determining a pulse decay time and an actual light yield of the radiation captured;

determining an estimated light yield corresponding to the pulse decay time; and calculating an adjusted light yield that is a product of the actual light yield times the light yield of NaX:Tl divided by the estimated light yield, wherein the light yield range is between 1.01 to 2.0.

13. A scintillation crystal comprising NaX:Tl, Sr, wherein:

X represents a halogen; and

Tl has a dopant concentration in a range of $1 \times 10^{-5}$ mol % to 0.2 mol %; and Sr has a dopant concentration greater than a dopant concentration of Tl; and the scintillation crystal has a pulse decay time that is no more than 80% less than a pulse decay time of a NAI:Tl crystal when the scintillation crystal and the NAI:Tl crystal are measured at 22° C. and exposed to gamma radiation having an energy of 662 keV.

14. The scintillation crystal of claim 13, wherein Sr has a concentration no greater than 0.9 mol %.

15. The scintillation crystal of claim 13, wherein the scintillation crystal has a greater light yield as compared to a NaI:Tl crystal when the scintillation crystal and the NaI:Tl crystal are measured at 22° C.

16. The scintillation crystal of claim 13, wherein the scintillation crystal has an energy resolution less than 6.4% when measured at 662 keV, 22° C., and an integration time of 1 microsecond.

17. The scintillation crystal of claim 13, wherein Sr has a concentration in a range of 0.01 mol % to 0.2 mol %.

18. The scintillation crystal of claim 13, The scintillation crystal of claim 1, wherein the pulse decay time is no more than 65% less than the pulse decay time of the NaI:Tl crystal.

19. The scintillation crystal of claim 13, wherein the pulse decay time is no more than 50% less than the pulse decay time of the NaI:Tl crystal.

20. The scintillation crystal of claim 13, wherein Tl has a concentration in a range of $1 \times 10^{-4}$ mol % to 0.15 mol %.

* * * * *

UNITED STATES PATENT AND TRADEMARK OFFICE
CERTIFICATE OF CORRECTION

PATENT NO. : 11,462,338 B2
APPLICATION NO. : 17/032756
DATED : October 4, 2022
INVENTOR(S) : Kan Yang et al.

Page 1 of 1

It is certified that error appears in the above-identified patent and that said Letters Patent is hereby corrected as shown below:

On the Title Page

In Column 1, Item (56), U.S. PATENT DOCUMENTS, page 2, Line 9, please delete "Yasui" and insert --YASUI et al.--

In Column 1, Item (56), OTHER PUBLICATIONS, page 2, Line 1-2, please delete "Upon Aliovaient Codoping" and insert --Upon Aliovalent Codoping--

In Column 2, Item (56), OTHER PUBLICATIONS, page 2, Line 11, please delete "SrX2 Microcrystais" and insert --SrX2 Microcrystals--

In the Specification

In Column 18, Line 27-28, please delete "a NAI:Tl crystal" and insert --a NaI:Tl crystal--

In Column 18, Line 28-29, please delete "the NAI:Tl crystal" and insert --the NaI:Tl crystal--

In Column 18, Line 51-52, please delete "the NAT' crystal" and insert --the NaI:Tl crystal--

In Column 19, Line 15-16, please delete "a NAI:Tl crystal" and insert --a NaI:Tl crystal--

In Column 19, Line 16-17, please delete "the NAI:Tl crystal" and insert --the NaI:Tl crystal--

Signed and Sealed this
Ninth Day of January, 2024

Katherine Kelly Vidal
*Director of the United States Patent and Trademark Office*